US00RE46531E

(19) United States
(12) Reissued Patent
Oren et al.

(10) Patent Number: US RE46,531 E
(45) Date of Reissued Patent: Sep. 5, 2017

(54) PROPPANT VESSEL BASE

(71) Applicant: Oren Technologies, LLC, Houston, TX (US)

(72) Inventors: John Oren, Houston, TX (US); Joshua Oren, Houston, TX (US)

(73) Assignee: OREN TECHNOLOGIES, LLC, Houston, TX (US)

(21) Appl. No.: 29/523,148

(22) Filed: Apr. 7, 2015

Related U.S. Patent Documents

Reissue of:
(64) Patent No.: Des. 688,349
Issued: Aug. 20, 2013
Appl. No.: 29/436,168
Filed: Nov. 2, 2012

U.S. Applications:
(62) Division of application No. 29/500,685, filed on Aug. 27, 2014, now Pat. No. Re. 45,713, which is an application for the reissue of Pat. No. Des. 688,349.

(51) LOC (10) Cl. ..... 23-01
(52) U.S. Cl.
USPC ..... D23/202
(58) Field of Classification Search
USPC ..... D23/202–206; D3/273; 206/386, 600, 206/1.5; D34/38; 220/581
(Continued)

(56) References Cited

U.S. PATENT DOCUMENTS 137,871 A 4/1873 Worsley
150,894 A 5/1874 Safely
(Continued)

FOREIGN PATENT DOCUMENTS

CA 2023138 2/1992
CA 2791088 3/2013
(Continued)

OTHER PUBLICATIONS

International Search Report for PCT/US2015/012990, dated May 6, 2015. (15 pages).
(Continued)

*Primary Examiner* — Phillip S Hyder
(74) *Attorney, Agent, or Firm* — Hogan Lovells US LLP

(57) CLAIM

The ornamental design for a proppant vessel base, as shown and described.

DESCRIPTION

FIG. 1 is an upper perspective view of the proppant vessel base showing *an embodiment of* our design.
FIG. 2 is a front [elevation] *elevational* view [thereof] *of the embodiment of FIG. 1*;
FIG. 3 is a rear [elevation] *elevational* view [thereof] *of the embodiment of FIG. 1*;
FIG. 4 is a *right* side [elevation] *elevational* view [thereof] *of the embodiment of FIG. 1*;
FIG. 5 is [an opposite] *a left* side [elevation] *elevational* view [thereof] *of the embodiment of FIG. 1*;
FIG. 6 is a top plan view [thereof] *of the embodiment of FIG. 1*; and,
FIG. 7 is a bottom plan view [thereof] *of the embodiment of FIG. 1*.
[The features presented in broken lines are for environmental purposes only and form no part of the claimed design.] *The broken lines depict portions of the proppant vessel in which the design is embodied that are not considered part of the claimed design.*

1 Claim, 2 Drawing Sheets

Matter enclosed in heavy brackets [ ] appears in the original patent but forms no part of this reissue; matter printed in italics indicates the additions made by reissue.

Amended

(58) Field of Classification Search
CPC ..... B65D 88/20; B65D 88/26; B65D 88/128; B65D 88/129
See application file for complete search history.

(56) References Cited

U.S. PATENT DOCUMENTS

| | | | |
|---|---|---|---|
| 384,443 | A | 6/1888 | Hoover |
| 448,238 | A | 3/1891 | Johnson |
| 917,649 | A | 4/1909 | Otto |
| 1,143,641 | A | 6/1915 | McGregor |
| 1,331,883 | A | 2/1920 | Stuart |
| 1,344,768 | A | 6/1920 | Messiter |
| 1,434,488 | A | 11/1922 | Forsythe et al. |
| 1,520,560 | A | 12/1923 | Burno |
| 1,506,936 | A | 9/1924 | Lea |
| 1,526,527 | A | 2/1925 | Butler |
| 1,573,664 | A | 2/1926 | Wetherill |
| 1,807,447 | A | 5/1931 | Smith |
| 1,850,000 | A | 3/1932 | Fernand |
| 1,932,320 | A | 10/1933 | Steward |
| 1,973,312 | A | 9/1934 | Hardinge |
| 2,233,005 | A | 2/1941 | Garlinghouse |
| 2,255,448 | A | 9/1941 | Morris |
| 2,293,160 | A | 8/1942 | Miller et al. |
| 2,368,672 | A | 2/1945 | McNamara |
| 2,381,103 | A | 8/1945 | Frank |
| 2,423,879 | A | 7/1947 | De Frees |
| 2,564,020 | A | 8/1951 | Mengel |
| 2,603,342 | A | 7/1952 | Martinson |
| 2,616,758 | A | 11/1952 | Meyers |
| 2,622,771 | A | 12/1952 | Tulou |
| 2,652,174 | A | 9/1953 | Shea et al. |
| 2,678,145 | A | 5/1954 | Ejuzwiak et al. |
| 2,693,282 | A | 11/1954 | Sensibar |
| 2,700,574 | A | 1/1955 | Tourneau |
| 2,792,262 | A | 4/1955 | Hathom |
| 2,774,515 | A | 12/1956 | Johansson et al. |
| 2,791,973 | A | 5/1957 | Dorey |
| 2,801,125 | A | 7/1957 | Page et al. |
| 2,808,164 | A | 10/1957 | Glendinning |
| 2,812,970 | A | 11/1957 | Martinson |
| 2,837,369 | A | 6/1958 | Stopps |
| 2,865,521 | A | 12/1958 | Fisher et al. |
| 2,873,036 | A | 2/1959 | Noble |
| 2,894,666 | A | 7/1959 | Campbell, Jr. |
| 2,988,235 | A | 6/1961 | Ronyak |
| 2,994,460 | A | 8/1961 | Matthews |
| 3,049,248 | A | 8/1962 | Heltzel et al. |
| 3,064,832 | A | 11/1962 | Heltzel |
| 3,083,879 | A | 4/1963 | Coleman |
| 3,090,527 | A | 5/1963 | Rensch |
| 3,109,389 | A | 11/1963 | Karlsson |
| 3,122,258 | A | 2/1964 | Raymond |
| 3,135,432 | A | 6/1964 | McKinney |
| 3,163,127 | A | 12/1964 | Gutridge et al. |
| 3,187,684 | A | 6/1965 | Ortner |
| 3,198,494 | A | 8/1965 | Curran et al. |
| 3,199,585 | A | 8/1965 | Cronberger |
| 3,248,026 | A | 4/1966 | Kemp |
| 3,255,927 | A | 6/1966 | Ruppert et al. |
| 3,265,443 | A | 8/1966 | Simas |
| 3,270,921 | A | 9/1966 | Nadolske et al. |
| 3,281,006 | A | 10/1966 | Wei |
| 3,294,306 | A | 12/1966 | Areddy |
| 3,318,473 | A | 5/1967 | Jones et al. |
| 3,353,599 | A | 11/1967 | Swift |
| 3,354,918 | A | 11/1967 | Coleman |
| 3,378,152 | A | 4/1968 | Warner |
| 3,387,570 | A | 6/1968 | Pulcrano et al. |
| 3,396,675 | A | 8/1968 | Stevens |
| 3,397,654 | A | 8/1968 | Snyder |
| 3,406,995 | A | 10/1968 | McCarthy |
| 3,407,971 | A | 10/1968 | Oehler |
| 3,425,599 | A | 2/1969 | Sammamo et al. |
| 3,455,474 | A | 7/1969 | Truncali |
| D216,511 | S * | 1/1970 | Coleman ..... D23/202 |
| 3,524,567 | A | 8/1970 | Coleman |
| 3,528,570 | A | 9/1970 | Pase |
| 3,561,633 | A | 2/1971 | Morrison et al. |
| 3,587,834 | A | 6/1971 | Dugge |
| 3,596,609 | A | 8/1971 | Ortner |
| 3,601,244 | A | 8/1971 | Ort et al. |
| 3,602,400 | A | 8/1971 | Cooke |
| 3,650,567 | A | 3/1972 | Danielson |
| 3,661,293 | A | 5/1972 | Gerhard et al. |
| 3,692,363 | A | 9/1972 | Tenebaum et al. |
| 3,704,797 | A | 12/1972 | Suykens |
| 3,729,121 | A | 4/1973 | Cannon |
| 3,734,215 | A | 5/1973 | Smith |
| 3,738,511 | A | 6/1973 | Lemon et al. |
| 3,777,909 | A | 12/1973 | Rheinfrank |
| 3,785,534 | A | 1/1974 | Smith |
| 3,802,584 | A | 4/1974 | Sackett |
| 3,817,261 | A | 6/1974 | Rogge |
| 3,827,578 | A | 8/1974 | Hough |
| 3,840,141 | A | 10/1974 | Allom et al. |
| 3,854,612 | A | 12/1974 | Snape |
| 3,861,716 | A | 1/1975 | Baxter et al. |
| 3,883,005 | A | 5/1975 | Stevens |
| 3,933,100 | A | 1/1976 | Dugge |
| 3,970,123 | A | 7/1976 | Poulton et al. |
| 3,986,708 | A | 10/1976 | Heltzel et al. |
| 3,997,089 | A | 12/1976 | Clarke et al. |
| 4,003,301 | A | 1/1977 | Norton |
| 4,004,700 | A | 1/1977 | Empey |
| 4,057,153 | A | 11/1977 | Weaver |
| 4,058,239 | A | 11/1977 | Van Mill |
| 4,063,656 | A | 12/1977 | Lambert |
| 4,073,410 | A | 2/1978 | Melcher |
| 4,138,163 | A | 2/1979 | Calvert et al. |
| 4,178,117 | A | 12/1979 | Brugler |
| 4,210,273 | A | 7/1980 | Hegele |
| 4,210,963 | A | 7/1980 | Ricciardi et al. |
| RE30,358 | E | 8/1980 | Sensibar |
| 4,222,498 | A | 9/1980 | Brock |
| 4,227,732 | A | 10/1980 | Kish |
| 4,232,884 | A | 11/1980 | DeWitt |
| 4,239,424 | A | 12/1980 | Pavolka |
| 4,247,228 | A | 1/1981 | Gray et al. |
| 4,258,953 | A | 3/1981 | Johnson |
| 4,265,266 | A | 5/1981 | Kierbow et al. |
| 4,278,190 | A | 7/1981 | Oory et al. |
| 4,282,988 | A | 8/1981 | Hulbert, Jr. |
| 4,287,921 | A | 9/1981 | Sanford |
| 4,287,997 | A | 9/1981 | Rolfe et al. |
| 4,289,353 | A | 9/1981 | Merritt |
| 4,299,597 | A | 11/1981 | Oetiker et al. |
| 4,306,895 | A | 12/1981 | Thompson et al. |
| 4,329,106 | A | 5/1982 | Adler |
| 4,350,241 | A | 9/1982 | Wenzel |
| 4,359,176 | A | 11/1982 | Johnson |
| 4,363,396 | A | 12/1982 | Wolf et al. |
| 4,397,406 | A | 8/1983 | Croley |
| 4,398,653 | A | 8/1983 | Daloisio |
| 4,402,392 | A | 9/1983 | Fabian et al. |
| 4,407,202 | A | 10/1983 | McCormick |
| 4,408,886 | A | 10/1983 | Sampson et al. |
| 4,410,106 | A | 10/1983 | Kierbow et al. |
| 4,427,133 | A | 1/1984 | Kierbow et al. |
| 4,428,504 | A | 1/1984 | Bassett et al. |
| 4,449,861 | A | 5/1984 | Saito et al. |
| 4,453,645 | A | 6/1984 | Usui et al. |
| 4,474,204 | A | 10/1984 | West |
| 4,475,672 | A | 10/1984 | Whitehead |
| 4,483,462 | A | 11/1984 | Heintz |
| 4,525,071 | A | 6/1985 | Horowitz |
| 4,532,098 | A | 7/1985 | Campbell |
| 4,569,394 | A | 2/1986 | Sweatman et al. |
| 4,571,143 | A | 2/1986 | Hellerich |
| 4,608,931 | A | 9/1986 | Ruhmann et al. |
| 4,619,531 | A | 10/1986 | Dunstan |
| 4,626,155 | A | 12/1986 | Hlinsky et al. |
| 4,626,166 | A | 12/1986 | Jolly |
| 4,628,825 | A | 12/1986 | Taylor et al. |

(56) References Cited

U.S. PATENT DOCUMENTS 4,660,733 A 4/1987 Snyder et al.
4,701,095 A 10/1987 Berryman et al.
4,715,754 A 12/1987 Scully
4,738,774 A 4/1988 Patrick
4,801,389 A 1/1989 Brannon et al.
4,819,830 A 4/1989 Schultz
4,848,605 A 7/1989 Wise
4,882,784 A 11/1989 Tump
4,889,219 A 12/1989 Key
4,901,649 A 2/1990 Fehrenbach et al.
4,909,378 A 3/1990 Webb
4,909,556 A 3/1990 Koskinen
4,919,583 A 4/1990 Speakman, Jr.
4,923,358 A 5/1990 Van Mill
4,946,068 A 8/1990 Erickson et al.
4,954,975 A 9/1990 Kalata
4,956,821 A 9/1990 Fenelon
4,975,205 A 12/1990 Sloan
4,995,522 A 2/1991 Barr
5,004,400 A 4/1991 Handke
5,042,538 A 8/1991 Wiese
5,069,352 A 12/1991 Harbolt et al.
5,080,259 A 1/1992 Hadley
5,082,304 A 1/1992 Preller
5,102,281 A 4/1992 Handke
5,102,286 A 4/1992 Fenton
5,105,858 A 4/1992 Levinson
5,131,524 A 7/1992 Uehara
5,190,182 A 3/1993 Copas et al.
5,195,861 A 3/1993 Handke
5,199,826 A 4/1993 Lawrence
5,201,546 A 4/1993 Lindsay
5,224,635 A 7/1993 Wise
5,253,746 A 10/1993 Friesen et al.
5,265,763 A 11/1993 Heinrici et al.
5,286,158 A 2/1994 Zimmerman
5,290,139 A 3/1994 Hedrick
5,324,097 A 6/1994 DeCap
5,339,996 A 8/1994 Dubbert
5,345,982 A 9/1994 Nadeau et al.
5,358,137 A 10/1994 Shuert et al.
5,373,792 A 12/1994 Pileggi et al.
5,402,915 A 4/1995 Hogan
5,413,154 A 5/1995 Hurst et al.
5,429,259 A 7/1995 Robin
5,441,321 A 8/1995 Karpisek
5,445,289 A 8/1995 Owen
5,465,829 A 11/1995 Kruse
5,470,175 A 11/1995 Jensen et al.
5,493,852 A 2/1996 Stewart
5,538,286 A 7/1996 Hoff
5,549,278 A 8/1996 Sidler
5,564,599 A 10/1996 Barber et al.
5,570,743 A 11/1996 Padgett et al.
5,590,976 A 1/1997 Kilheffer et al.
5,601,181 A 2/1997 Lindhorst
5,602,761 A 2/1997 Spoerre et al.
5,613,446 A 3/1997 DiLuigi et al.
5,617,974 A 4/1997 Sawyer
5,647,514 A 7/1997 Toth et al.
RE35,580 E 8/1997 Heider et al.
5,667,298 A 9/1997 Musil
5,687,881 A 11/1997 Rouse et al.
5,690,466 A 11/1997 Gaddis et al.
5,697,535 A 12/1997 Coleman
5,704,477 A * 1/1998 Hermann et al. ..... 206/386
5,706,614 A 1/1998 Wiley et al.
5,718,555 A 2/1998 Swalheim
5,722,552 A 3/1998 Olson
5,761,854 A 6/1998 Johnson et al.
5,762,222 A 6/1998 Liu
5,772,390 A 6/1998 Walker
5,782,524 A 7/1998 Heider et al.
5,785,421 A 7/1998 Milek
5,803,296 A 9/1998 Olson
5,806,863 A 9/1998 Heger et al.
5,836,480 A 11/1998 Epp et al.
5,845,799 A 12/1998 Deaton
5,876,172 A 3/1999 Di Rosa
5,906,471 A 5/1999 Schwoerer
5,911,337 A 6/1999 Bedeker
5,927,558 A 7/1999 Bruce
5,971,219 A 10/1999 Karpisek
5,993,202 A 11/1999 Yamazaki et al.
6,002,063 A 12/1999 Bilak et al.
6,006,918 A 12/1999 Hart
6,069,118 A 5/2000 Hinkel et al.
6,077,068 A 6/2000 Okumura
6,092,974 A 7/2000 Roth
6,109,486 A 8/2000 Lee
6,120,233 A 9/2000 Adam
6,155,175 A 12/2000 Rude et al.
6,186,654 B1 2/2001 Gunteret et al.
6,190,107 B1 2/2001 Lanigan et al.
6,192,985 B1 2/2001 Hinkel et al.
6,196,590 B1 3/2001 Kim
6,205,938 B1 3/2001 Foley et al.
6,247,594 B1 6/2001 Garton
6,263,803 B1 7/2001 Dohr et al.
6,269,849 B1 8/2001 Fields
6,273,154 B1 8/2001 Laug
6,283,212 B1 9/2001 Hinkel et al.
6,286,986 B2 9/2001 Grimland
6,296,109 B1 10/2001 Nohl
6,306,800 B1 10/2001 Samuel et al.
6,328,156 B1 12/2001 Ostman
6,328,183 B1 12/2001 Coleman
6,364,584 B1 4/2002 Taylor
6,374,915 B1 4/2002 Andrews
6,382,446 B1 5/2002 Hinkle et al.
6,401,983 B1 6/2002 McDonald et al.
6,412,422 B2 7/2002 Dohr et al.
6,415,909 B1 7/2002 Mitchell et al.
6,416,271 B1 7/2002 Pigott et al.
6,425,725 B1 7/2002 Ehlers
6,457,291 B2 10/2002 Wick
6,505,760 B1 1/2003 Werner
6,508,387 B1 1/2003 Simon et al.
6,508,615 B2 1/2003 Taylor
6,523,482 B2 2/2003 Wingate
6,537,002 B2 3/2003 Gloystein
6,575,614 B2 6/2003 Tosco et al.
6,660,693 B2 12/2003 Miller et al.
6,663,373 B2 12/2003 Yoshida
6,666,573 B2 12/2003 Grassi
6,675,073 B2 1/2004 Kieman et al.
6,705,449 B2 3/2004 Wagstaffe
6,720,290 B2 4/2004 England et al.
6,772,912 B1 8/2004 Schall et al.
6,774,318 B2 8/2004 Beal et al.
6,776,235 B1 8/2004 England
6,783,032 B2 8/2004 Fons
6,811,048 B2 11/2004 Lau
6,828,280 B2 12/2004 England et al.
6,835,041 B1 12/2004 Albert
6,882,960 B2 4/2005 Miller
6,902,061 B1 6/2005 Elstone
6,915,854 B2 7/2005 England et al.
6,953,119 B1 10/2005 Wening
6,955,127 B2 10/2005 Taylor
6,964,551 B1 11/2005 Friesen
6,968,946 B2 11/2005 Shuert
6,974,021 B1 12/2005 Boevers
7,008,163 B2 3/2006 Russell
7,036,662 B2 * 5/2006 Schutz ..... 206/386
7,051,661 B2 5/2006 Herzog et al.
7,084,095 B2 8/2006 Lee et al.
7,104,425 B2 9/2006 Le Roy
7,140,516 B2 11/2006 Bothor
7,146,914 B2 12/2006 Morton et al.
7,201,290 B2 4/2007 Mehus et al.
7,214,028 B2 5/2007 Boasso
7,240,681 B2 7/2007 Saik
7,252,309 B2 8/2007 Eng Soon et al.

(56) References Cited

U.S. PATENT DOCUMENTS

| | | | | |
|---|---|---|---|---|
| 7,284,579 | B2 | 10/2007 | Elgan et al. | |
| 7,284,670 | B2 | 10/2007 | Schmid | |
| 7,316,333 | B2 | 1/2008 | Wegner | |
| 7,367,271 | B2 | 5/2008 | Early | |
| 7,377,219 | B2 | 5/2008 | Brandt | |
| 7,410,623 | B2 | 8/2008 | Mehus et al. | |
| 7,475,796 | B2 | 1/2009 | Garton | |
| 7,500,817 | B2 | 3/2009 | Furrer et al. | |
| 7,513,280 | B2 | 4/2009 | Brashears et al. | |
| 7,591,386 | B2 | 9/2009 | Hooper | |
| 7,640,075 | B2 | 12/2009 | Wietgrefe | |
| 7,695,538 | B2 | 4/2010 | Cheng | |
| 7,753,637 | B2 | 7/2010 | Benedict et al. | |
| 7,798,558 | B2 | 9/2010 | Messier | |
| 7,802,958 | B2 | 9/2010 | Garcia et al. | |
| 7,803,321 | B2 | 9/2010 | Lark et al. | |
| 7,837,427 | B2 | 11/2010 | Beckel | |
| 7,841,394 | B2 | 11/2010 | McNeel et al. | |
| 7,845,516 | B2 | 12/2010 | Pessin et al. | |
| 7,858,888 | B2 | 12/2010 | Lucas et al. | |
| 7,878,327 | B2 * | 2/2011 | Cassina | 206/386 |
| 7,891,304 | B2 | 2/2011 | Herzog et al. | |
| 7,891,523 | B2 | 2/2011 | Mehus et al. | |
| 7,896,198 | B2 | 3/2011 | Mehus et al. | |
| 7,897,223 | B2 * | 3/2011 | Schubbach et al. | 428/35.7 |
| 7,921,783 | B2 | 4/2011 | Forbes et al. | |
| 7,958,995 | B2 * | 6/2011 | Dedmon et al. | 206/386 |
| 7,967,161 | B2 | 6/2011 | Townsend | |
| 7,980,803 | B2 | 7/2011 | Brandstätter et al. | |
| 7,997,623 | B2 | 8/2011 | Williams | |
| 8,083,083 | B1 | 12/2011 | Mohns | |
| 8,201,520 | B2 | 6/2012 | Meritt | |
| 8,313,278 | B2 | 11/2012 | Simmons et al. | |
| 8,366,349 | B2 | 2/2013 | Beachner | |
| 8,375,690 | B2 | 2/2013 | LaFargue et al. | |
| 8,379,927 | B2 | 2/2013 | Taylor | |
| 8,387,824 | B2 | 3/2013 | Wietgrefe | |
| 8,393,502 | B2 | 3/2013 | Renyer et al. | |
| 8,424,666 | B2 | 4/2013 | Berning et al. | |
| D688,351 | S | 8/2013 | Oren | |
| 8,505,780 | B2 | 8/2013 | Oren | |
| 8,544,419 | B1 | 10/2013 | Spalding et al. | |
| 8,545,148 | B2 | 10/2013 | Wanek-Pusset et al. | |
| 8,562,022 | B2 | 10/2013 | Nadeau et al. | |
| 8,573,387 | B2 | 11/2013 | Trimble | |
| 8,573,917 | B2 | 11/2013 | Renyer | |
| 8,585,341 | B1 | 11/2013 | Oren | |
| D694,670 | S | 12/2013 | Oren | |
| 8,616,370 | B2 | 12/2013 | Allegretti | |
| 8,622,251 | B2 | 1/2014 | Oren | |
| 8,636,832 | B2 | 1/2014 | Stutzman et al. | |
| 8,646,641 | B2 | 2/2014 | Moir | |
| 8,668,430 | B2 | 3/2014 | Oren | |
| 8,820,559 | B2 | 9/2014 | Beitler et al. | |
| 8,827,118 | B2 | 9/2014 | Oren | |
| 8,887,914 | B2 | 11/2014 | Allegretti | |
| 8,905,266 | B2 | 12/2014 | De Brabanter | |
| 8,915,691 | B2 | 12/2014 | Mintz | |
| 9,051,801 | B1 | 6/2015 | Mintz | |
| 9,052,034 | B1 | 6/2015 | Wegner et al. | |
| 9,267,266 | B2 | 2/2016 | Cutler et al. | |
| 2001/0022308 | A1 | 9/2001 | Epp et al. | |
| 2001/0045338 | A1 | 11/2001 | Ransil et al. | |
| 2002/0134550 | A1 | 9/2002 | Leeson et al. | |
| 2002/0139643 | A1 | 10/2002 | Peltier et al. | |
| 2003/0006248 | A1 | 1/2003 | Gill et al. | |
| 2003/0111470 | A1 | 6/2003 | Fouillet et al. | |
| 2003/0145418 | A1 | 8/2003 | Ikeda et al. | |
| 2003/0156929 | A1 | 8/2003 | Russell | |
| 2004/0065699 | A1 | 4/2004 | Schoer et al. | |
| 2004/0074922 | A1 | 4/2004 | Bother et al. | |
| 2004/0084874 | A1 | 5/2004 | McDougall et al. | |
| 2004/0206646 | A1 | 10/2004 | Goh | |
| 2004/0245284 | A1 | 12/2004 | Mehus et al. | |
| 2005/0158158 | A1 | 7/2005 | Porta | |
| 2005/0201851 | A1 | 9/2005 | Jonkka | |
| 2006/0012183 | A1 | 1/2006 | Marchiori et al. | |
| 2006/0027582 | A1 | 2/2006 | Beach | |
| 2006/0053582 | A1 | 3/2006 | Engel et al. | |
| 2006/0091072 | A1 | 5/2006 | Schmid et al. | |
| 2006/0151058 | A1 | 7/2006 | Salaoras et al. | |
| 2006/0180062 | A1 | 8/2006 | Furrer et al. | |
| 2006/0180232 | A1 | 8/2006 | Glewwe et al. | |
| 2006/0239806 | A1 | 10/2006 | Yelton | |
| 2006/0267377 | A1 | 11/2006 | Lusk et al. | |
| 2006/0289166 | A1 | 12/2006 | Stromquist et al. | |
| 2007/0096537 | A1 | 5/2007 | Hicks | |
| 2007/0125543 | A1 | 6/2007 | McNeel et al. | |
| 2008/0008562 | A1 | 1/2008 | Beckel et al. | |
| 2008/0029546 | A1 | 2/2008 | Schuld | |
| 2008/0029553 | A1 | 2/2008 | Culleton | |
| 2008/0179054 | A1 | 7/2008 | McGough et al. | |
| 2008/0179324 | A1 | 7/2008 | McGough et al. | |
| 2008/0213073 | A1 | 9/2008 | Benedict et al. | |
| 2008/0226434 | A1 | 9/2008 | Smith et al. | |
| 2008/0264641 | A1 | 10/2008 | Slabaugh et al. | |
| 2008/0277423 | A1 | 11/2008 | Garton | |
| 2009/0038242 | A1 | 2/2009 | Cope | |
| 2009/0078410 | A1 | 3/2009 | Krenek et al. | |
| 2009/0278326 | A1 | 11/2009 | Rowland et al. | |
| 2010/0021258 | A1 | 1/2010 | Kim | |
| 2010/0037572 | A1 | 2/2010 | Cheng | |
| 2010/0038143 | A1 | 2/2010 | Burnett et al. | |
| 2010/0040446 | A1 | 2/2010 | Renyer | |
| 2010/0108711 | A1 | 5/2010 | Wietgrefe | |
| 2010/0129193 | A1 | 5/2010 | Sherrer | |
| 2010/0278621 | A1 | 11/2010 | Redekop | |
| 2010/0288603 | A1 | 11/2010 | Schafer | |
| 2011/0011893 | A1 | 1/2011 | Cerny | |
| 2011/0017693 | A1 | 1/2011 | Thomas | |
| 2011/0101040 | A1 | 5/2011 | Weissbrod | |
| 2011/0109073 | A1 | 5/2011 | Williams | |
| 2011/0127178 | A1 | 6/2011 | Claussen | |
| 2011/0162838 | A1 | 7/2011 | Mackenzie et al. | |
| 2011/0168593 | A1 | 7/2011 | Neufeld et al. | |
| 2011/0222983 | A1 | 9/2011 | Dugic et al. | |
| 2011/0297702 | A1 | 12/2011 | Hildebrandt et al. | |
| 2012/0103848 | A1 | 5/2012 | Allegretti et al. | |
| 2012/0219391 | A1 | 8/2012 | Teichrob et al. | |
| 2012/0255539 | A1 | 10/2012 | Kolecki | |
| 2013/0004272 | A1 | 1/2013 | Mintz | |
| 2013/0022441 | A1 | 1/2013 | Uhryn et al. | |
| 2013/0206415 | A1 | 8/2013 | Sheesley | |
| 2013/0209204 | A1 | 8/2013 | Sheesley | |
| 2013/0233545 | A1 | 9/2013 | Mahoney | |
| 2013/0284729 | A1 | 10/2013 | Cook et al. | |
| 2013/0309052 | A1 | 11/2013 | Luharuka | |
| 2014/0020892 | A1 | 1/2014 | Oren | |
| 2014/0023465 | A1 | 1/2014 | Oren et al. | |
| 2014/0034662 | A1 | 2/2014 | Chalmers et al. | |
| 2014/0044507 | A1 | 2/2014 | Naizer et al. | |
| 2014/0083554 | A1 | 3/2014 | Harris | |
| 2014/0093319 | A1 | 4/2014 | Harris et al. | |
| 2014/0097182 | A1 | 4/2014 | Sheesley | |
| 2014/0166647 | A1 | 6/2014 | Sheesley | |
| 2014/0203046 | A1 | 7/2014 | Allegretti | |
| 2014/0234059 | A1 | 8/2014 | Thomeer | |
| 2014/0321950 | A1 | 10/2014 | Krenek et al. | |
| 2015/0004895 | A1 | 1/2015 | Hammers et al. | |
| 2015/0069052 | A1 | 3/2015 | Allegretti et al. | |
| 2015/0110565 | A1 | 4/2015 | Harris | |
| 2015/0159232 | A1 | 6/2015 | Zucchi et al. | |
| 2016/0280480 | A1 | 9/2016 | Smith et al. | |
| 2017/0129721 | A1 | 5/2017 | Harris et al. | |

FOREIGN PATENT DOCUMENTS

| | | |
|---|---|---|
| CN | 201390486 | 1/2010 |
| CN | 201881469 | 6/2011 |
| CN | 103350017 | 10/2013 |
| DE | 3342281 | 6/1985 |
| DE | 4217329 | 5/1993 |
| EP | 0019967 | 12/1980 |
| EP | 322283 | 6/1989 |

(56) References Cited

FOREIGN PATENT DOCUMENTS

| | | |
|---|---|---|
| EP | 0564969 | 10/1993 |
| EP | 0997607 | 5/2000 |
| EP | 1052194 | 11/2000 |
| EP | 1167236 | 1/2002 |
| EP | 1775190 | 4/2007 |
| EP | 2062832 | 5/2009 |
| EP | 2311757 | 4/2011 |
| FR | 2640598 | 6/1990 |
| GB | 2374864 | 10/2002 |
| JP | S4871029 | 9/1973 |
| JP | S4876041 | 9/1973 |
| JP | S58161888 | 10/1983 |
| JP | 410087046 | 4/1998 |
| JP | 10264882 | 10/1998 |
| MX | 2012011046 | 5/2013 |
| WO | 9008082 | 7/1990 |
| WO | 9202437 | 2/1992 |
| WO | 9301997 | 2/1993 |
| WO | 9300031 | 4/1993 |
| WO | 2007005054 | 1/2007 |
| WO | 2007061310 | 5/2007 |
| WO | 2010026235 | 3/2010 |
| WO | 2011099358 | 8/2011 |
| WO | 2012021447 | 2/2012 |
| WO | 2012058059 | 5/2012 |

OTHER PUBLICATIONS

FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
International Search Report for related International Application No. PCT/US2012/066639, Feb. 25, 2013.
International Search Report for related International Application No. PCT/US2013/035442, Jun. 23, 2013.
International Search Report for related International Application No. PCT/US2013/032819, May 23, 2013.
International Search Report for related International Application No. PCT/US2013/049028, Mar. 4, 2014.
International Preliminary Report on Patentability for PCT/US2012/066639, Feb. 26, 2013.
International Preliminary Report on Patentability for PCT/US2013/032819, Sep. 23, 2014.
European Search Report for Application No. 15167039.5, Sep. 8, 2015. (7 pages).
International Search Report for PCT/US2015/024810, Jul. 8, 2015. (13 pages).
PCT International Search Report for PCT/US15/57601, May 6, 2016. (11 pages).
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.
SandBox Logistics, "Mine to Wellhead Logistics," Houston, TX, May 2013.
SandBox Logistics, screenshots from video made in Apr. 2013 and publicly shown in May 2013, Arnegard, North Dakota.
International Search Report for PCT/US15/35635, Oct. 30, 2015. (12 pages).
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
Non-Final Office Action Mailed Dec. 28, 2016 for co-pending U.S. Appl. No. 13/628,702.
Non-Final Office Action Mailed Jan. 13, 2017 for co-pending U.S. Appl. No. 14/923,920.
Final Office Action Mailed Jan. 12, 2017 for co-pending U.S. Appl. No. 14/841,942.
Non-Final Office Action Mailed Dec. 23, 2016 for co-pending U.S. Appl. No. 14/485,686.
Non-Final Office Action Mailed Jan. 27, 2017 for co-pending U.S. Appl. No. 14/485,687.
Non-Final Office Action Mailed Dec. 20, 2016 for co-pending U.S. Appl. No. 14/831,924.
Final Office Action Mailed Jan. 19, 2017 for co-pending U.S. Appl. No. 13/660,855.
Final Office Action Mailed Nov. 25, 2016 for co-pending U.S. Appl. No. 15/152,744.
Non-Final Office Action Mailed Dec. 15, 2016 for co-pending U.S. Appl. No. 14/848,447.
Non-Final Office Action Mailed Dec. 9, 2016 for co-pending U.S. Appl. No. 14/927,614.
International Search Report for PCT Application No. PCT/US2016/050859 mailed Dec. 9, 2016.
Arrows Up, Inc., Jumbo BTS—Bulk Transport System, Aug. 1, 2014.
Arrows Up, Inc., Reusable Packaging Association, Member Spotlight: John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield Infrastructure, Mobile Sand Silo System, 2016.
Final Office Action Mailed Sep. 27, 2016 for co-pending U.S. Appl. No. 13/555,635.
Non- Final Office Action Mailed Mar. 23, 2016 for co-pending U.S. Appl. No. 13/555,635.
Final Office Action Mailed Jul. 30, 2015 for co-pending U.S. Appl. No. 13/555,635.
Non-Final Office Action Mailed Oct. 22, 2014 for co-pending U.S. Appl. No. 13/555,635.
Final Office Action Mailed Jun. 21, 2016 for co-pending U.S. Appl. No. 13/628,702.
Non-Final Office Action Mailed Feb. 23, 2016 for co-pending U.S. Appl. No. 13/628,702.
Final Office Action Mailed Sep. 22, 2015 for co-pending U.S. Appl. No. 13/628,702.
Non-Final Office Action Mailed Jul. 28, 2015 for co-pending U.S. Appl. No. 13/628,702.
Final Office Action Mailed Mar. 24, 2015 for co-pending U.S. Appl. No. 13/628,702.
Non-Final Office Action Mailed Sep. 18, 2014 for co-pending U.S. Appl. No. 13/628,702.
Final Office Action Mailed Jun. 27, 2016 for co-pending U.S. Appl. No. 14/831,924.
Non-Final Office Action Mailed Feb. 16, 2016 for co-pending U.S. Appl. No. 14/831,924.

(56) References Cited

OTHER PUBLICATIONS

Final Office Action Mailed Jun. 27, 2016 for co-pending U.S. Appl. No. 14/923,920.
Non-Final Office Action Mailed Feb. 9, 2016 for co-pending U.S. Appl. No. 14/923,920.
Final Office Action Mailed Sep. 15, 2016 for co-pending U.S. Appl. No. 14/943,111.
Non-Final Office Action Mailed Apr. 5, 2016 for co-pending U.S. Appl. No. 14/943,111.
Final Office Action Mailed Jul. 18, 2016 for co-pending U.S. Appl. No. 14/948,494.
Non-Final Office Action Mailed Apr. 8, 2016 for co-pending U.S. Appl. No. 14/948,494.
Non-Final Office Action Mailed Sep. 6, 2016 for co-pending U.S. Appl. No. 15/144,296.
Non-Final Office Action Mailed Jul. 25, 2016 for co-pending U.S. Appl. No. 13/660,855.
Final Office Action Mailed Apr. 28, 2016 for co-pending U.S. Appl. No. 13/660,855.
Non-Final Office Action Mailed Oct. 8, 2015 for co-pending U.S. Appl. No. 13/660,855.
Final Office Action Mailed Aug. 6, 2015 for co-pending U.S. Appl. No. 13/660,855.
Non-Final Office Action Mailed Apr. 29, 2015 for co-pending U.S. Appl. No. 13/660,855.
Final Office Action Mailed Dec. 17, 2014 for co-pending U.S. Appl. No. 13/660,855.
Non-Final Office Action Mailed Sep. 4, 2014 for co-pending U.S. Appl. No. 13/660,855.
Final Office Action Mailed Sep. 24, 2013 for co-pending U.S. Appl. No. 13/660,855.
Non-Final Office Action Mailed May 14, 2013 for co-pending U.S. Appl. No. 13/660,855.
Non-Final Office Action Mailed Jul. 5, 2016 for co-pending U.S. Appl. No. 14/996,362.
Non-Final Office Action Mailed Jul. 6, 2016 for co-pending U.S. Appl. No. 15/144,450.
Final Office Action Mailed Sep. 29, 2016 for co-pending U.S. Appl. No. 13/768,962.
Non-Final Office Action Mailed Apr. 5, 2016 for co-pending U.S. Appl. No. 13/768,962.
Final Office Action Mailed Oct. 9, 2015 for co-pending U.S. Appl. No. 13/768,962.
Non-Final Office Action Mailed May 1, 2015 for co-pending U.S. Appl. No. 13/768,962.
Non-Final Office Action Mailed Jul. 18, 2016 for co-pending U.S. Appl. No. 15/152,744.
Non-Final Office Action Mailed Apr. 13, 2016 for co-pending U.S. Appl. No. 14/738,485.
Non-Final Office Action Mailed Sep. 7, 2016 for co-pending U.S. Appl. No. 14/841,942.
Final Office Action Mailed May 12, 2016 for co-pending U.S. Appl. No. 14/841,942.
Non-Final Office Action Mailed Nov. 30, 2015 for co-pending U.S. Appl. No. 14/841,942.
Non-Final Office Action Mailed Jul. 21, 2016 for co-pending U.S. Appl. No. 15/083,596.
Non-Final Office Action Mailed Aug. 19, 2016 for co-pending U.S. Appl. No. 15/084,613.
Non-Final Office Action Mailed Sep. 6, 2016 for co-pending U.S. Appl. No. 15/143,942.
Final Office Action Mailed Sep. 1, 2016 for co-pending U.S. Appl. No. 14/848,447.
Non-Final Office Action Mailed Apr. 8, 2016 for co-pending U.S. Appl. No. 14/848,447.
Non-Final Office Action Mailed Oct. 27, 2016 for co-pending U.S. Appl. No. 15/219,676.
Non-Final Office Action Mailed Nov. 9, 2016 for co-pending U.S. Appl. No. 14/948,494.
Final Office Action Mailed Nov. 4, 2016 for co-pending U.S. Appl. No. 14/738,485.
Non-Final Office Action Mailed May 13, 2016 for co-pending U.S. Appl. No. 14/986,826.
Final Office Action Mailed Sep. 15, 2016 for co-pending U.S. Appl. No. 14/922,836.
Non-Final Office Action Mailed Feb. 4, 2016 for co-pending U.S. Appl. No. 14/922,836.
Final Office Action Mailed Aug. 25, 2016 for co-pending U.S. Appl. No. 14/927,614.
Non-Final Office Action Mailed Mar. 1, 2016 for co-pending U.S. Appl. No. 14/927,614.
Non-Final Office Action Mailed Apr. 29, 2016 for co-pending U.S. Appl. No. 14/943,182.
Final Office Action Mailed Sep. 15, 2016 for co-pending U.S. Appl. No. 14/882,973.
Non-Final Office Action Mailed Feb. 11, 2016 for co-pending U.S. Appl. No. 14/882,973.
Non-Final Office Action Mailed Aug. 11, 2016 for co-pending U.S. Appl. No. 13/625,675.
Final Office Action Mailed Nov. 11, 2015 for co-pending U.S. Appl. No. 13/625,675.
Non-Final Office Action Mailed Mar. 11, 2015 for co-pending U.S. Appl. No. 13/625,675.
Non-Final Office Action Mailed Apr. 3, 2017 for co-pending U.S. Appl. No. 13/555,635.
Non-Final Office Action Mailed Feb. 14, 2017 for co-pending U.S. Appl. No. 14/943,111.
Final Office Action Mailed Mar. 7, 2017 for co-pending U.S. Appl. No. 15/144,296.
Non-Final Office Action Mailed Apr. 6, 2017 for co-pending U.S. Appl. No. 13/768,962.
Non-Final Office Action Mailed Mar. 6, 2017 for co-pending U.S. Appl. No. 15/152,744.
Non-Final Office Action Mailed Feb. 24, 2017 for co-pending U.S. Appl. No. 14/943,182.
File History for U.S. Appl. No. 61/538,616, Robert A. Harris, Sep. 23, 2011. (21 pages).
International Search Report and Written Opinion for PCT/US2017/012271, dated May 22, 2017.
Non-Final Office Action dated Apr. 24, 2017 for co-pending U.S. Appl. No. 14/738,485.
Final Office Action dated May 4, 2017 for co-pending U.S. Appl. No. 15/143,942.
Final Office Action dated May 30, 2017 for co-pending U.S. Appl. No. 13/625,675.
Final Office Action dated Apr. 19, 2017 for co-pending U.S. Appl. No. 15/219,640.
Non-Final Office Action dated Jun. 1, 2017 for co-pending U.S. Appl. No. 15/219,640.
Final Office Action dated May 2, 2017 for co-pending U.S. Appl. No. 15/219,676.
Non-Final Office Action dated May 10, 2017 for co-pending U.S. Appl. No. 14/882,973.

* cited by examiner

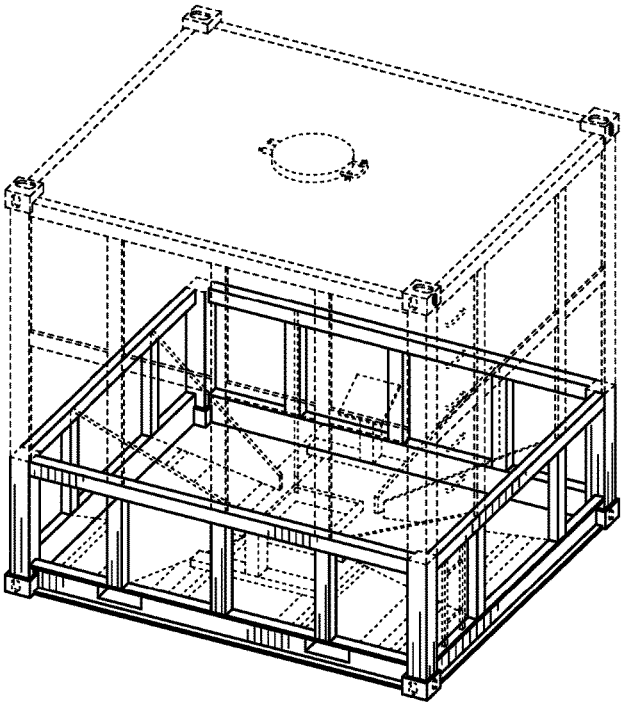
FIG. 1
Amended
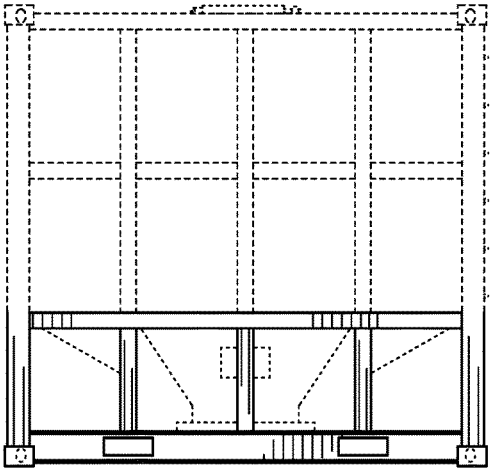
FIG. 2
Amended
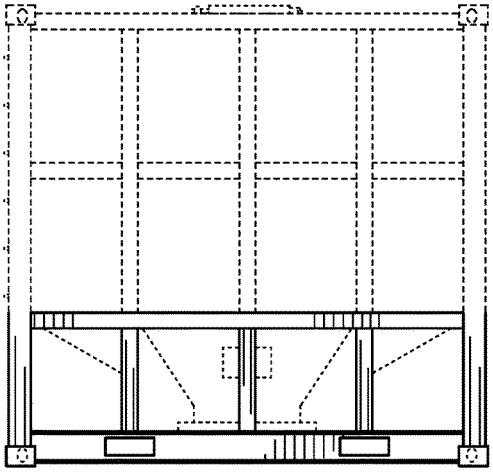
FIG. 3
Amended

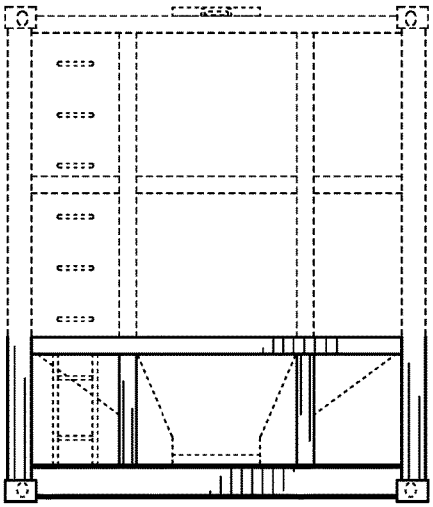
FIG. 4
Amended
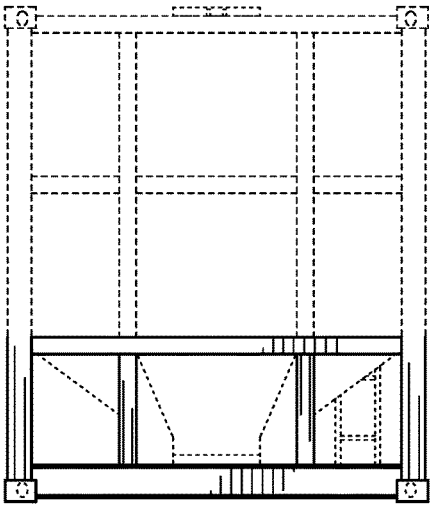
FIG. 5
Amended
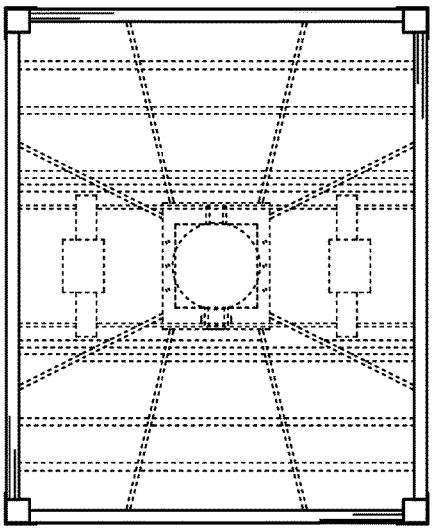
FIG. 6
Amended
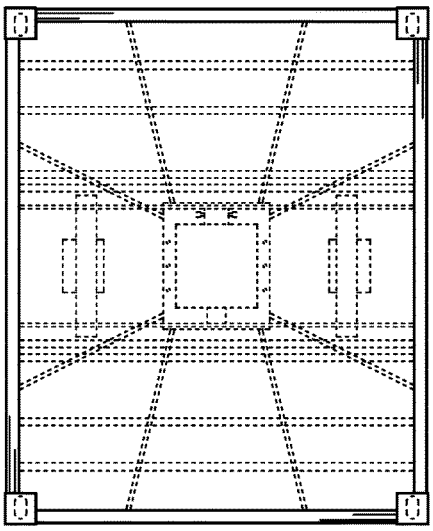
FIG. 7
Amended